Oct. 19, 1937.  F. G. OSGOOD  2,096,685
STOP APPLYING MACHINE FOR SLIDE FASTENERS
Original Filed Oct. 5, 1934   7 Sheets-Sheet 1

INVENTOR.
Frank G. Osgood
BY Kelley & Chisholm
ATTORNEYS.

Oct. 19, 1937.  F. G. OSGOOD  2,096,685
STOP APPLYING MACHINE FOR SLIDE FASTENERS
Original Filed Oct. 5, 1934   7 Sheets-Sheet 6

INVENTOR.
Frank G. Osgood
BY Kelley & Chisholm
ATTORNEYS.

Oct. 19, 1937.   F. G. OSGOOD   2,096,685
STOP APPLYING MACHINE FOR SLIDE FASTENERS
Original Filed Oct. 5, 1934    7 Sheets-Sheet 7

INVENTOR.
Frank G. Osgood
BY Kelley & Chisholm
ATTORNEYS.

Patented Oct. 19, 1937

2,096,685

UNITED STATES PATENT OFFICE 2,096,685

STOP APPLYING MACHINE FOR SLIDE FASTENERS

Frank G. Osgood, Meadville, Pa., assignor to Hookless Fastener Company, a corporation of Pennsylvania Application October 5, 1934, Serial No. 747,031
Renewed March 10, 1937

13 Claims. (Cl. 153—1)

My invention relates to machines for applying stops to the stringers of slide fasteners.

The object of the invention is to provide a machine which will place the stop members accurately in the proper position automatically and attach them firmly to the tapes of the fastener stringers.

In the manufacture of slide fasteners the series of very small fastener elements are formed and attached to the tape by automatic machines in spaced apart groups. In order to complete the fastener it is necessary to connect two of the groups together, apply a bottom stop accurately in position at the bottom end of the groups, which also serves as a permanent connection between the two stringers, place a slider on the stringers, and then to apply top stops one on each stringer. In former methods of manufacture it was necessary to cut the stringers apart before applying the bottom stops and the stops were applied by a machine which required the hand feeding of the bottom stops to a fixture, the hand placing of the fastener stringers in the fixture in order that the tapes might be guided accurately into the proper position with relation to the bottom stop.

The problems involved are peculiar and no existing automatic machines which are known would be satisfactory for the bottom stop attaching operation. At the outset there is the problem of attaching a very small member of metal accurately in position on two fabric members. It is first necessary to locate the tapes accurately because the bottom stop must be applied in a definite position adjacent the bottom ends of the rows of fastener elements. The two tapes between groups of members must be spread apart sufficiently to allow the bottom stop to enter between them, then the bottom stop must be moved up to a position close to the ends of the rows of fastener members and then the tapes must be positioned between the jaws of the bottom stop member.

A further problem is to provide a machine which will accommodate various lengths of fasteners because in the manufacture of slide fasteners the lengths vary from two inches up by intervals of one eighth of an inch. Furthermore, the machine must be made substantially safe and fool-proof in operation in order to avoid damage to the fastener stringers which are relatively of considerable value at the time they reach the bottom stop attaching machine.

The machine comprises mechanism for arranging the stops automatically, feeding them continuously, carrying them to clamping position, feeding the tape and controlling its position accurately for the operation of clamping on the bottom stops. It further involves the use of electrical controls, so as to prevent operation of the machine until both the tape and bottom stop are in accurate position ready for the clamping operation.

In the accompanying drawings I have shown for purposes of illustration, one embodiment which my invention may assume in practice. In these drawings.

Figures 2, 3, 4:
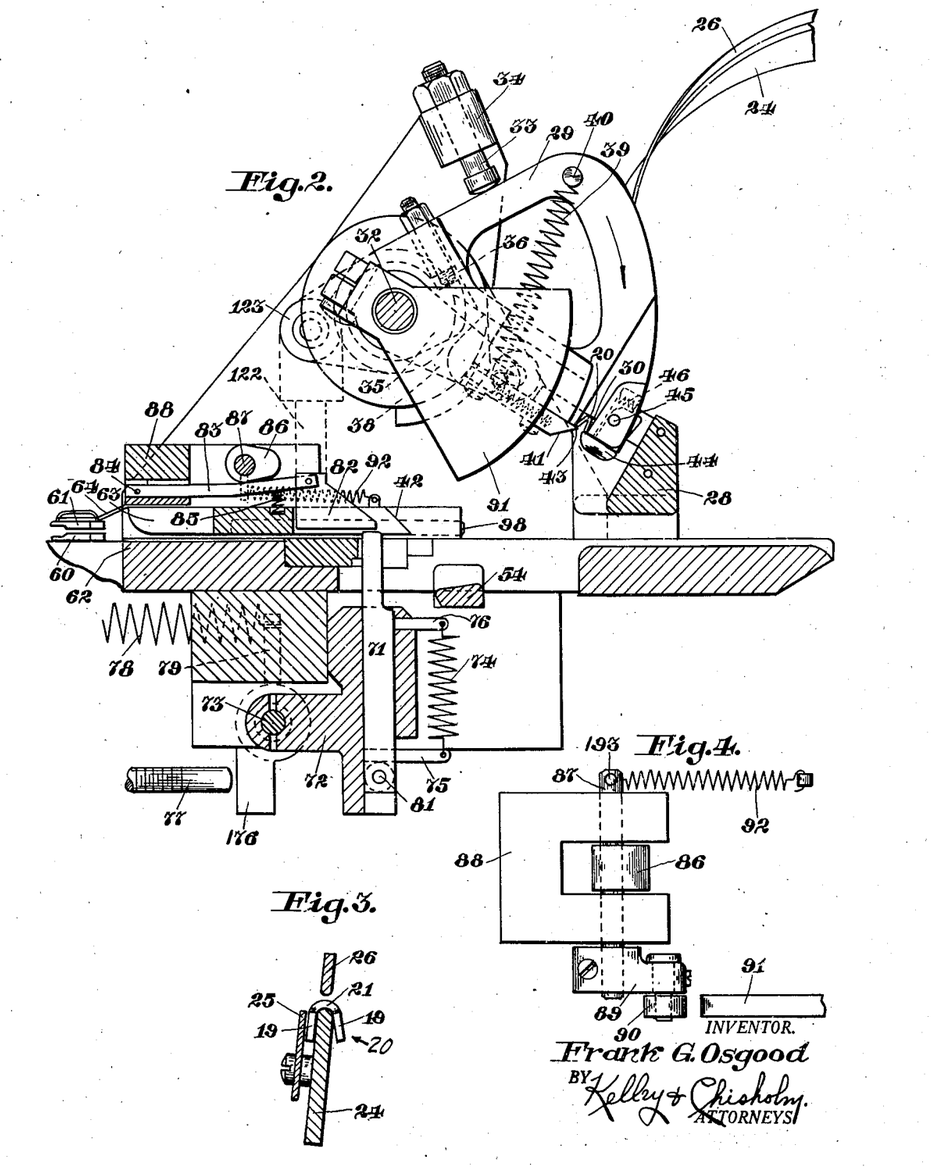
Fig. 2 is a vertical central section.
Fig. 3 is a detail cross-sectional view of the chute.
Fig. 4 is a detail plan view of the tape holding mechanism.
Figures 5, 6:
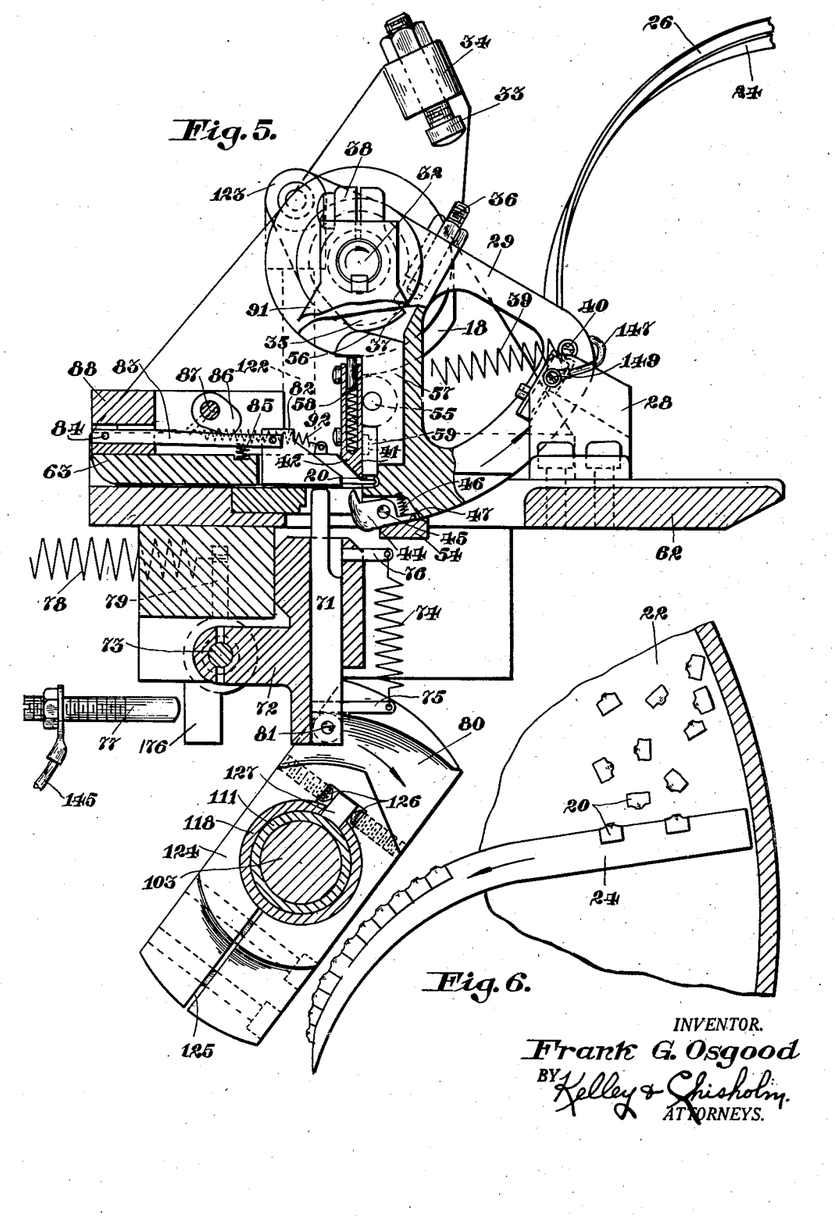
Fig. 5 is a vertical section showing the parts in different position from that of Fig. 2 with the carrier cut away.
Fig. 6 is a detail view of the bottom stop assorting mechanism.

The present machine is adapted for feeding the bottom stop members of a type commonly used in commercial production but it will be understood that various other kinds of stop members may be manufactured with certain changes in the machine to adapt the tools to the particular form of stop. The present stop member 20 as shown in Figs. 3 and 6 comprises a pair of parallel gripping jaws 19 united by a narrow yoke 21. The gripping jaws are sufficiently wide to embrace the corded edges of the two connected stringers and combine them firmly together. The stop members are placed in a suitable bowl 22 and agitated in the bowl by a compressed air jet 23. The jet is so directed that the bottom stop members are blown against the edge of the blade 24 which is sufficiently thin to allow the sides of the bottom stop member to pass over the blade and slide along the edge of the blade as shown in Fig. 6. The blade is inclined so that the bottom stop members slide by gravity downwardly toward the machine. During their passage along the blade they are held in position by suitable retaining members 25 and 26.

Figures 13, 14:
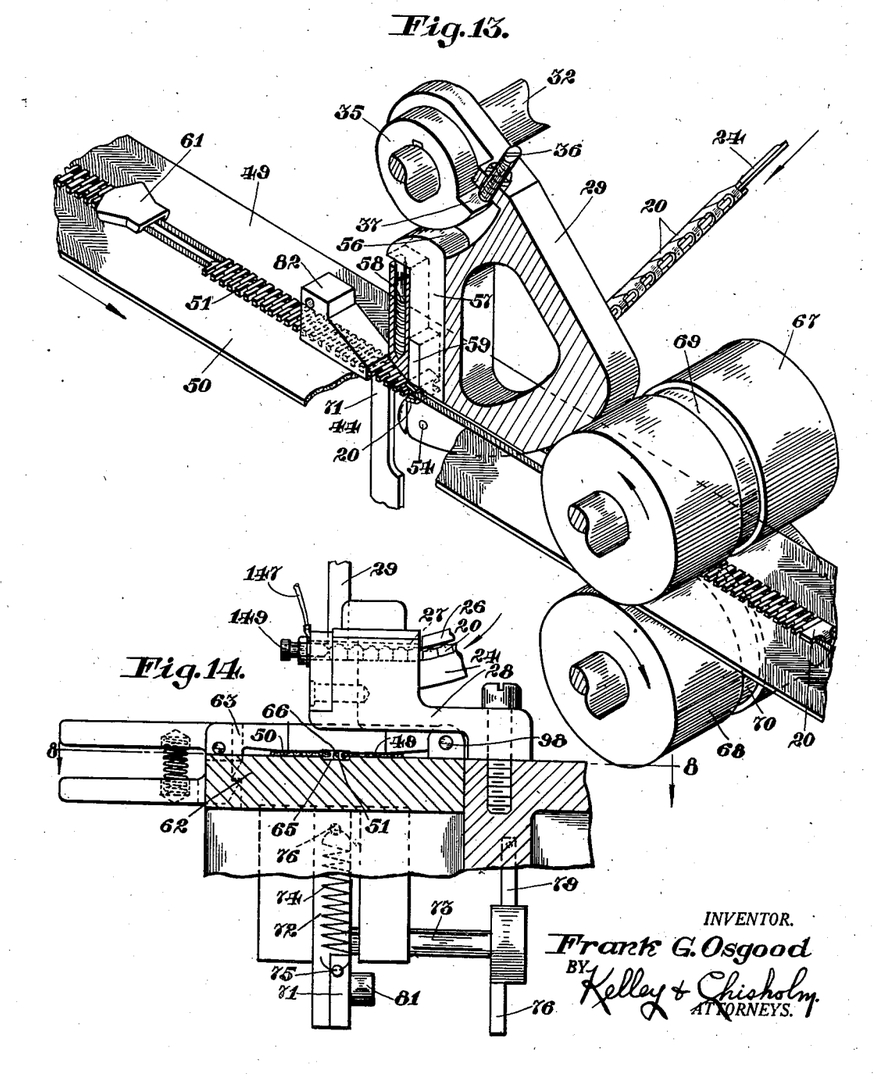
Fig. 13 is a schematic view showing the principal working parts.
Fig. 14 is a cross-section on line 14—14 of Fig. 1.

Referring now to Figs. 2 and 14 the bottom stop members come to the end of the chute into the passageway 27 of the casting 28. When the bottom stop carrier 29 is in position to receive a stop member, the end member on the pack passes into the recess 30 of the bottom stop carrier against an electrical stop contact, the function of which will be described later herein.

The bottom stop carrier 29 has the general form of a triangular bracket mounted for free swinging movement about the shaft 32. At the time it receives a bottom stop as shown in Figs. 2 and 14 the bottom stop carrier is bearing against the adjustable stop pin 33 mounted in the stationary bracket 34. An oscillating movement is imparted to the shaft 32 which has a lost motion connection with the bottom stop carrier through the cam 35 keyed to the shaft 32 and the adjustable pin 36 attached to the swinging carrier. When the shaft 32 swings in a counter-clockwise direction as viewed in Figs. 2 and 13, the shoulder 37 on the cam 35 will engage the pin 36 and lift the swinging carrier into the position shown in Fig. 2. When the shaft 32 swings in the clockwise direction as viewed in Fig. 5, it carries with it the crank 38 keyed to the shaft 32 to the end of which is attached a coil spring 39 which is connected to the swinging carrier at 40. The clockwise rotation of the shaft 29 will thus tighten the spring 39 and cause the swinging carrier to swing to its downward position, as shown in Figs. 5 and 13. The downward swinging movement is arrested by the inclined stop surfaces 41, 42 on the swinging carrier and machine bed, respectively.

During the downward swinging movement, the bottom stop 20 is held in the recess 30 by the relatively stationary shoulder 43 and by the shoulder on the movable member 44 which is pivoted to the swinging arm at 45. This swinging bottom stop holder is held in holding position normally by the coil spring 46, which bears against the arm 47 as seen in Fig. 5. Carried by the clamping member 57 is a roller 55 which follows the stationary cam plate 18 during the downward swinging movement of the carrier (see Figs. 5 and 7), causing the clamping tool 59 to clamp down on the bottom stop just enough to keep it from being displaced in the recess.

Figures 11, 12:
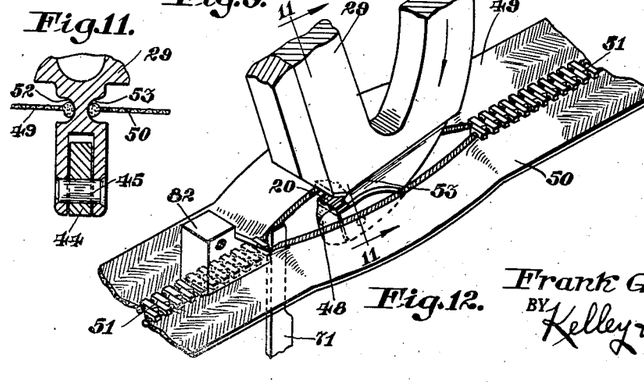
Fig. 11 is a cross-section of the bottom stop carrier on line 11—11 of Fig. 12.
Fig. 12 is a perspective view showing the bottom stop in the process of being carried between the tapes.

It will be noted in Fig. 12, that the front end and corner of the swinging member 44 are tapered as shown at 48 so that it enters between and wedges apart the slide fastener tapes 49, 50. This wedging movement is essential in order that the bottom stop 20 may pass between the tapes. When the carrier has swung far enough to bring the bottom stop adjacent the group of fastener elements 51, the tapes 49, 50 will snap back into the grooves 52—53 so that the corded edges of the tapes may pass between the clamping jaws of the bottom stop. During the final operation of the swinging movement, it will be noted in Fig. 5, that the swinging holder 44 has been swung downwardly by the action of the stationary cam 54 working against the under side of the swinging holder. The parts are shown in the final position ready for clamping, in Fig. 13, and in Fig. 5 the parts are shown in the final position after the clamping operation has been effected.

After the swinging movement of the bottom stop carrier has been arrested by the stop surfaces 41, 42, the shaft 32 continues to swing in the clockwise direction and carries with it the cam 35. This cam bears on the cam surface 56 of the clamping member 57 which is slidably mounted in the swinging carrier. A spring and plunger 58 normally hold the clamping member in retracted position until it is operated upon by the cam 35. The clamping tool 59 attached to the end of the clamping member, bears directly against the bottom stop and presses it firmly against the slide fastener tapes, the opposite side of the bottom stop member meanwhile being held stationary by the bottom surface of the recess 30 in the swinging carrier.

After the clamping operation, the shaft 32 will swing in a counter-clockwise direction releasing the clamping member 57 and returning the bottom stop carrier to its original position against the stop 33.

Figures 8, 9, 10, 17:
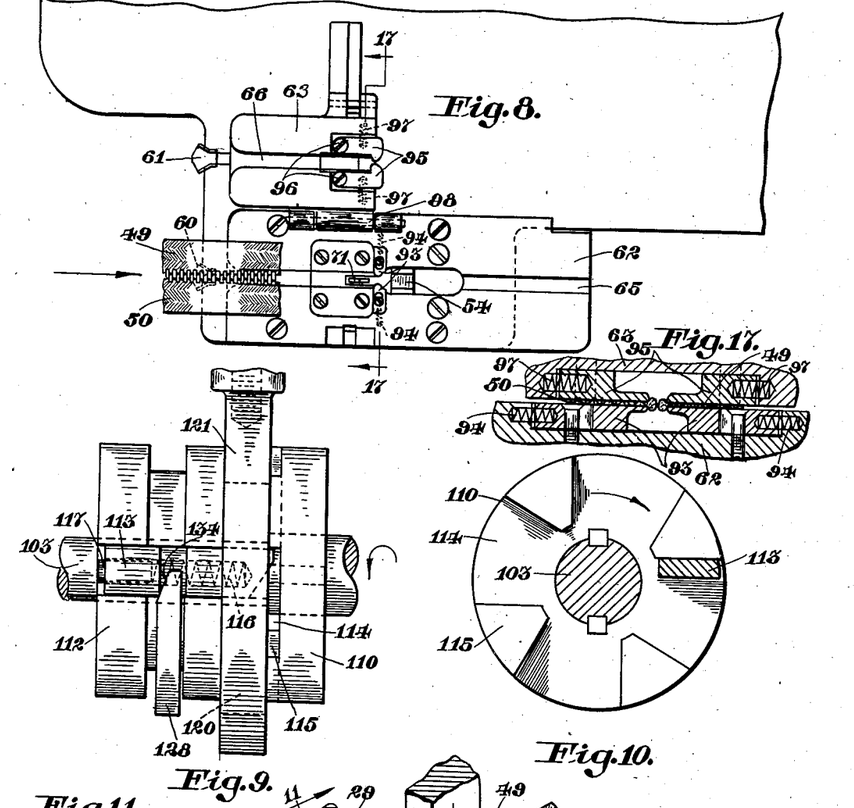
Fig. 8 is a detail plan view of a portion of the mechanism on line 8—8 of Fig. 14 showing upper plate in open position.
Figs. 9 and 10 are detail and sectional views respectively of the clutch.
Fig. 17 is a cross-section on line 17—17 of Fig. 8, showing the upper plate in closed position.

The fastener strips 49, 50 with their attached fastener elements 51 are interlocked together in proper order so that each group of fastener elements will make a complete fastener. There are blank lengths of tape between groups of fastener elements called "gap spaces" where the groups of fasteners can be cut apart leaving tape ends which can be folded over in attaching the fastener in the article. If any of the fastener elements have become accidentally disengaged, suitable cam means may be provided for reengaging them consisting of two halves 60, 61 of a conventional slider used for closing the fastener, except that the neck or wedge part of the slider is omitted. The lower half 60 is attached to the bed plate 62 of the machine, as seen in Figs. 2 and 8, whereas the upper half is attached to the movable upper guide plate 63 by means of the bracket 64. The fastener strips are fed between the bed plate 62 and the upper guide plate 63 and those parts are provided with registering guideways 65, 66, respectively, for guiding the rows of fastener elements. The upper guide plate is hinged to the lower plate as shown at 98, in Figs. 8 and 14, for the purpose of enabling the same to be lifted to gain access to the guideways for easy threading of the fastener chain into the machine.

The upper guide plate terminates at the point where the bottom stop is clamped on the tapes but the guideway in the bed plate of the machine continues to a pair of feed rollers 67, 68, between which the fastener tapes pass, such rollers being provided with central grooves 69, 70, respectively, for the rows of fastener elements. The feed rollers may be made of any suitable material such as rubber or metal, and are preferably adjustable relative to one another so that they can grip the fastener strips with the desired degree of friction. The adjustment between the rollers is such that the feed of the fastener strips may be stopped at will while the movement of the feed rollers continues, but at the same time, as soon as the stop is removed, the feed rollers will pick up the tape and move it forward again.

Means is provided for stopping the movement of the fastener strips accurately at the proper point for attachment of a bottom stop, and for holding such fastener strips in position while the bottom stop is being attached. For stopping the fastener strip feed a vertically movable stop finger 71 is slidably mounted in a swinging bracket 72 pivoted to the stationary frame at 73. A coil spring 74 attached to the stop by the arm 75 and to the bracket by arm 76, tends to hold the stop finger upwardly at all times. The stop finger is relatively thin and in position to register with the space between the tapes at the gap spaces where there are no fastener elements attached. When, therefore, a blank space is presented over the stop finger, the stop finger will jump upwardly between the tapes and as the strip feed continues and the fastener elements strike against the stop finger, while in the position shown in Fig. 2, the pressure thus exerted against the stop finger will swing the bracket 72 until the stop arm 176 strikes against the stationary adjustable stop pin 77. The swinging bracket is normally held in position as shown in Figs. 2 and 5, by the coil spring 78 acting on the arm 79 attached to the bracket.

At the proper time when the bottom stop carrier has brought a bottom stop member to a point adjacent the clamping station, the stop pin is withdrawn by means of the cam groove 80 in which is engaged the cam follower 81 attached to the stop pin. The operation of the cam 80 will be more fully described hereafter.

At the time of withdrawal of the stop pin and until the bottom stop is firmly clamped in position, means are required for holding the tape stationary against the pull of the feed rollers. This is accomplished by a shoe 82 movable through an opening in the upper guide plate and in position to bear against the fastener elements. The shoe 82 is carried on the end of an arm 83 pivoted at 84 to the block 88. A compression spring 85 normally holds the shoe away from the fastener elements so that it exerts no pressure. A cam 86 on a shaft 87 pivoted in the guide plate operates the lever arm 83 and presses the shoe 82 in contact with the fastener elements at the proper time. The cam and shaft 86, 87 are carried by the block 88, which may be a part of or attached to the guide plate 63.

Figure 1:
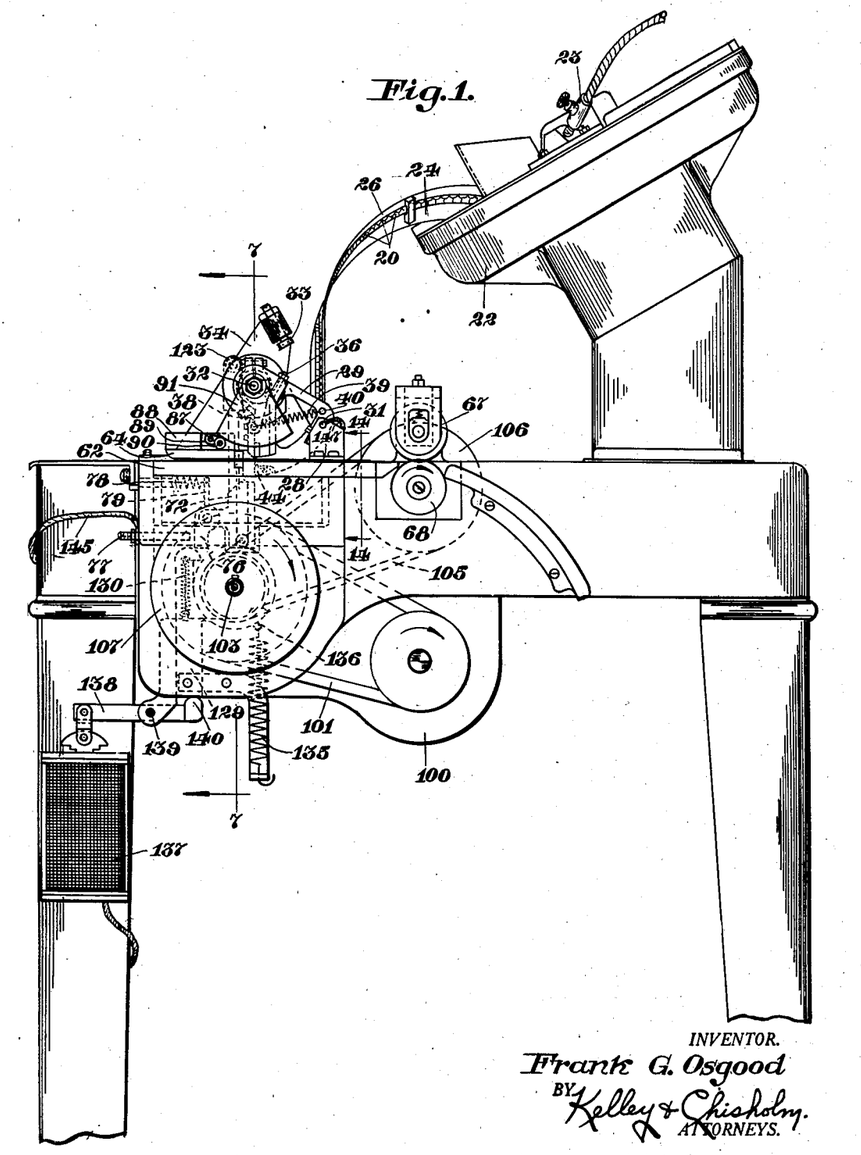
Fig. 1 is a front elevation of the machine.
Figure 7:
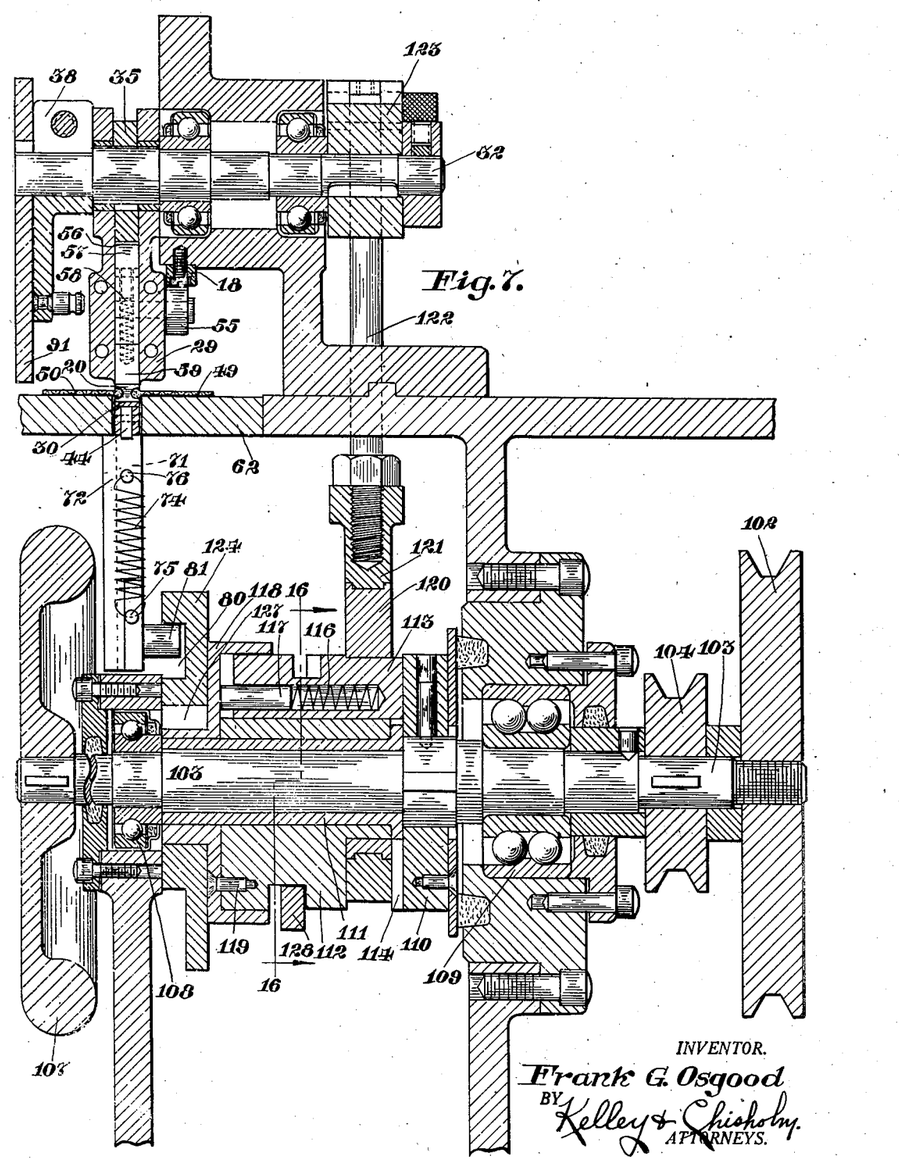
Fig. 7 is a vertical cross-sectional view through the machine on line 7—7 of Fig. 1.

As seen in Fig. 4, the shaft 87 has attached thereto a crank 89 at one end which carries a cam roller 90 actuated by the plate cam 91 attached on the end of the shaft 32, (see Figs. 1 and 7). The return movement of the cam 86 is accomplished by a coil spring 92 attached to an arm 193.

Attention is directed now to Figs. 8 and 17 showing the manner of moving the corded edges of the fastener tapes into the spaces between the plates of the bottom stop and holding them there firmly while the stop is being clamped on the corded edges. This is accomplished by spring fingers 93 on the bed plate of the machine adjustably held by screws and elongated slots as illustrated. These fingers are normally pressed inwardly by springs 94. A pair of fingers 95 on the upper guide plate 63 have a similar function and are pivoted on the screws 96 and pressed inwardly by springs 97. These fingers thus act in the manner illustrated directly against the corded edges to press them inwardly toward each other when the bottom stop is in proper position.

Referring now to Figs. 1 and 7, the machine is driven from a motor 100 through a belt 101, pulley 102, on the main drive shaft 103. A small pulley 104 on the drive shaft operates the feed rollers through a belt 105 and pulley 106. The drive shaft carries on its other end a flywheel 107 which may also be used for the hand adjustment of the machine. The main shaft is mounted in suitable bearings 108, 109 in the frame of the machine. Keyed to the central part of the shaft is the driving member 110 of the clutch assembly. Adjacent the driving member the shaft carries a bearing sleeve 111, on which the driven member 112 of the clutch assembly is rotatably mounted. Engagement between the driving and driven members is accomplished by a sliding key 113 which slides in a suitable guideway in the driven clutch collar 112. The end of the key engages in relatively wide notches 114 between the lugs 115 of the driving member. (See Fig. 10.) The clutch key is normally pressed toward engaging position by a coil spring 116 acting through the pin 117 against the collar 118, which is securely fastened to the driven clutch collar 112 by suitable screws 119. An eccentric 120 is rigidly attached to the driven clutch collar 112 and is surrounded by an eccentric strap 121 to which a link 122 is attached. The link 122 connects to the shaft 32 through a crank 123 (see Figs. 5 and 7). The cam plate 124 which carries the cam groove 80 is mounted on the collar 118 at the left end of the driving shaft, as seen in Fig. 7, and is adjustable relative to the collar by reason of the construction shown in Fig. 5. The cam plate 124 is split at 125 and when loosened on the collar, it can be adjusted by moving the adjusting screws 126, which bear against the key 127.

Figure 16:
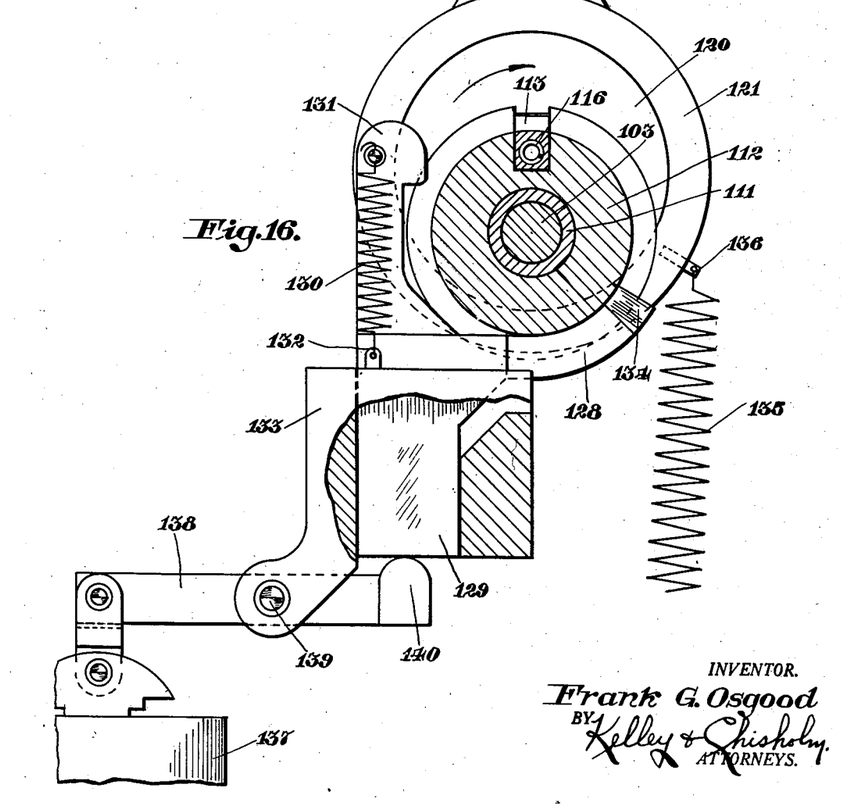
Fig. 16 is a cross-section on line 16—16 of Fig. 7, showing the clutch operating mechanism.

Referring now to Figs. 9 and 16, the clutch key is controlled by the clutch operating member 128 which is attached to the vertically movable block 129 and normally held in the downward position by a coil spring 130 attached to an upstanding arm 131 of the block 129, and having its stationary end 132 attached to the stationary member 133.

Assuming that the clutch operating member 128 is held upwardly in position to disengage the clutch, the clutch key 113 will strike the beveled face 134 of the clutch operating member, and will be pulled toward the left against the compression of spring 116, thus disengaging the key from the driving member of the clutch.

The cams are so designed that the clamping on of the bottom stop will be completed at about the time the parts are in the position shown in Fig. 16. It is then desired to return the bottom stop carrier immediately to its initial position in order that it may quickly pick up a bottom stop. This is accomplished faster than the ordinary operation of the machine by means of a coil spring 135 attached at 136 to the eccentric strap. This spring has sufficient strength to pull the eccentric strap and its connected parts through the shaft 32 ahead of the clutch operating key, so that the clutch key by reason of its beveled end construction, will ratchet over the clutch lugs 115. This spring causes the bottom stop carrier to return with a snap-like action, and tends to hold it in such position until the clutch key is again in released position, thereby engaging the clutch so as to drive the parts positively.

Figure 15:
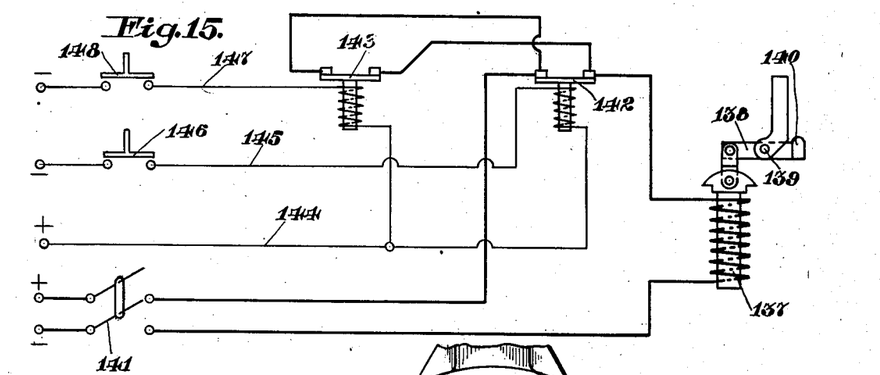
Fig. 15 is a wiring diagram for the electrical apparatus.

The electrical clutch control mechanism will now be described. The clutch operating solenoid 137 has its armature connected to a lever 138 pivoted at 139 and terminating in a rounded end 140, which bears on the under face of the clutch operating member 129. When the solenoid is energized the clutch is disengaged so that in order to engage the clutch and start the machine, the solenoid must be completely de-energized. The solenoid 137 is normally energized from the main line source of power through the switch 141, but the solenoid circuit will be interrupted by the relay switch 142 or the relay switch 143, which is in parallel relation with 142. Thus if either of the relay switches is closed, the solenoid may be energized and the machine can not start. It is accordingly necessary to open both switches 142, 143 before the machine can operate. The relay switch 142 is energized from lines 144, 145 under the control of the contact switch 146 and similarly the switch 143 is energized through the lines 144, 147 under the control of the contact switch 148. The contact switch 146 is controlled by the bottom stop striking the contact post 149 (see Fig. 14). This serves to complete the circuit through the ground or by way of the frame of the machine to energize the solenoid 142 and open the relay. The other relay is controlled by the stop finger which interrupts the tape movement. The positive wire is connected to the stop post 77 so that when the arm 76 is swung into contact with it, the circuit will be grounded and the relay switch 143 energized and opened. In this manner the clutch operating solenoid can not be de-energized until a bottom stop is in position in the bottom stop carrier and until the fastener strips are in position to receive the bottom stop.

The operation of the machine will be readily understood in view of the above description and may be briefly summarized as follows.

The bottom stops are fed in orderly arrangement by gravity down the chute and when the bottom stop carrier is in its lifted position, the end bottom stop member will move into the carrier and be held there by the movable finger 44. The stop member relay will therefore be opened. The fastener strips will be fed forwardly until the fastener members strike the stop finger when the tape control relay will be opened thereby de-energizing the clutch operating solenoid. The shaft 32 thereupon moves in a clockwise direction thereby tightening the spring attached to the bottom stop carrier. This will swing the bottom stop carrier to its downward position carrying the stop member between the tapes. The stop member holding finger 44 will swing out of the way, the stop finger 71 will pull downwardly out of the way, and the tape control fingers will press the corded edges of the tape between the plates of the bottom stop member. The clamping tool will then operate to clamp the bottom stop in position and shortly thereafter the bottom stop carrier may be returned with a snap action to its original position, and the clutch will be disengaged as soon as the clutch key strikes the clutch operating member. It will be observed that the return movement of the stop finger and the breaking of the bottom stop contact have caused the solenoid 137 to be energized, thereby engaging the clutch operating member with the clutch key causing the clutch to be disengaged. The operation is repeated over and over and the machine automatically adjusts itself to any length of fastener and various sizes of gap spacing between groups of fasteners.

While I have shown and described in this application one embodiment which my invention may assume in practice, it will be understood that this embodiment is merely for the purpose of illustration and that other forms may be devised within the scope of my invention as set forth in the appended claims.

What I claim as my invention is:

1. A machine of the class described comprising a guideway, means for supplying a fastener strip consisting of two parallel tapes having attached thereto spaced groups of fastener elements, each group of fastener elements on one tape being interlocked with a corresponding group on the opposite tape, means for supplying bottom stop members, means for relatively positioning said strip and bottom stop members so that said bottom stop members arrive successively in position at the end of a group of fastener elements, and clamping means for attaching said bottom stop members to said tapes in said positions.

2. A machine of the class described comprising a guideway, means for feeding a continuous fastener strip which consists of groups of fastener elements attached to a flat tape, a stop member projecting into said guideway for engaging said groups of elements to locate the strip in position for an end member, means for supplying end members for said fastener strip, means for holding said strip in position during attachment of said end members while said stop member is removed, and means for attaching said end members to the strip adjacent the end of each of said group of fastener elements.

3. A machine of the class described comprising a guideway, means for supplying a continuous fastener strip which consists of a pair of parallel tapes arranged in edge to edge relation and spaced groups of interlocked fastener elements attached to said tapes, means for supplying fastener elements attached to said tapes, means for supplying bottom stops including a bottom stop carrier movable between said tapes to bring said bottom stops into position adjacent the end of a group of fastener elements, and means for clamping said bottom stop in said position.

4. The combination defined in claim 3 wherein said bottom stop clamping means includes a tool mounted on said movable stop carrier and movable relative thereto.

5. A machine of the class described comprising a guideway for a fastener strip which consists of a group of fastener elements attached to a flexible tape carrier, means for positioning said fastener strip, means for supplying stop members to a stop carrier, a stop carrier for transferring said stop members to clamping position, and means controlling the movement of said carrier to prevent its moving to clamping position until a bottom stop has been properly positioned therein.

6. A machine of the class described comprising a guideway for a fastener strip which consists of a group of fastener elements attached to a flexible tape carrier, means for positioning said fastener strip, means for supplying stop members to a stop carrier, a stop carrier for transferring said stop members to clamping position, and means controlling the movement of said carrier to prevent its moving to clamping position until said fastener strip has been positioned to receive a stop member.

7. A machine of the class described comprising a guideway for a fastener strip which consists of a group of fastener elements attached to a flexible tape carrier, means for positioning said fastener strip, means for supplying stop members to a stop carrier, a stop carrier for transferring said stop members to clamping position, and means controlling the movement of said carrier to prevent its moving to clamping position until said fastener strip has been positioned to receive a fastener member and until a bottom stop is in proper position on said carrier.

8. A machine of the class described comprising a guideway, means for supplying a continuous fastener strip to said guideway, said fastener strip consisting of spaced groups of fastener elements attached to parallel tapes, each group of fastener elements on one tape being interlocked with a corresponding group on the opposite tape, means for supplying bottom stops of the form having parallel plates united by a narrow yoke, means for bringing a bottom stop into position between said tapes at the end of each group of fastener elements successively, means for holding the tape edges between the opposed plates of the bottom stop member, and means for clamping the plates together to bind said bottom stop member on said tapes.

9. A machine of the class described comprising means for feeding a fastener strip of a type which consists of a group of fastener elements attached to a flexible tape carrier, means for interrupting the feed of said strip at the proper position for attachment of an end stop member, means for supplying stop members including a movable stop carrier, driving means for effecting movement of said stop carrier, and electrical means for controlling the movement of said stop carrier to prevent its movement until said strip is in position and until a bottom stop is positioned in said carrier.

10. The machine combination defined in claim 9 wherein said electrical means includes a solenoid for controlling the driving means for said stop carrier, and relay switches controlled by the position of a bottom stop in said carrier and by the position of said fastener strip for controlling the energization of said solenoid.

11. A machine of the class described comprising means for supplying a fastener strip of the type consisting of a group of fastener elements attached to a flexible tape carrier, means for supplying end stop members to the end of the group of fastener elements for attachment thereto comprising a bottom stop carrier, means for imparting an intermittent movement to said bottom stop carrier from a position where it receives a stop member to the clamping position and return, including a spring for effecting a quick return of said stop carrier to the point where it receives the bottom stop.

12. A machine of the class described comprising means for supplying a continuous fastener strip consisting of two parallel tapes having attached thereto spaced groups of fastener elements, each group of fastener elements on one tape being interlocked with a corresponding group on the opposite tape, means for supplying end members, means controlled by the strip for positioning said end members at the end of each group of fastener elements, and clamping means for attaching said end members to said tapes in said position.

13. A machine of the class described comprising means for supplying a continuous fastener strip consisting of two parallel tapes having attached thereto spaced groups of fastener elements, means for supplying end members, means controlled by one end of each of said groups of fastener elements for positioning said end members at the end of each group of fastener elements, and clamping means for attaching said end members to said tapes in said position.

FRANK G. OSGOOD.